(12) United States Patent
Zhang et al.

(10) Patent No.: US 12,331,258 B2
(45) Date of Patent: Jun. 17, 2025

(54) CARBON DIOXIDE CONVERSION PROCESS AND SYSTEM THEREFOR

(71) Applicant: KOREA RESEARCH INSTITUTE OF CHEMICAL TECHNOLOGY, Daejeon (KR)

(72) Inventors: Chundong Zhang, Daejeon (KR); Ki Won Jun, Daejeon (KR); Seok Ki Kim, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 760 days.

(21) Appl. No.: 17/427,509

(22) PCT Filed: Jan. 28, 2020

(86) PCT No.: PCT/KR2020/001275
§ 371 (c)(1),
(2) Date: Jul. 30, 2021

(87) PCT Pub. No.: WO2020/159188
PCT Pub. Date: Aug. 6, 2020

(65) Prior Publication Data
US 2022/0127538 A1    Apr. 28, 2022

(30) Foreign Application Priority Data

Jan. 31, 2019  (KR) .................. 10-2019-0013064
Oct. 2, 2019   (KR) .................. 10-2019-0122009

(51) Int. Cl.
*C10L 3/08*    (2006.01)
*B01D 3/06*    (2006.01)
(Continued)

(52) U.S. Cl.
CPC .................. *C10L 3/08* (2013.01); *B01D 3/06* (2013.01); *B01D 3/42* (2013.01); *B01D 5/006* (2013.01);
(Continued)

(58) Field of Classification Search
CPC ........ C10L 3/08; C10L 3/104; C10L 2290/42; B01D 3/06; B01D 3/42; B01D 5/006
See application file for complete search history.

(56) References Cited

U.S. PATENT DOCUMENTS

| 8,506,910 B2 | 8/2013 | Singh et al. |
| 2008/0142410 A1* | 6/2008 | Cruijsberg ................ C07C 4/04 208/106 |

(Continued)

FOREIGN PATENT DOCUMENTS

| CN | 101617027 A | 12/2009 |
| CN | 102730637 A | 10/2012 |

(Continued)

OTHER PUBLICATIONS

International Search Report issued on Aug. 31, 2020 for corresponding international application No. PCT/KR2020/001275.

(Continued)

*Primary Examiner* — Matthew J Merkling
(74) *Attorney, Agent, or Firm* — Hauptman Ham, LLP (57) ABSTRACT

Proposed is a carbon dioxide conversion system and method. More particularly, proposed is an eco-friendly carbon dioxide conversion system and method, the system and the method returning, in the recycling of Fischer-Tropsch synthesis reaction off-gas, a part of the off-gas to a Fischer-Tropsch reactor and producing a synthetic natural gas through methanation of the remainder of the off-gas, thereby improving overall energy efficiency and carbon efficiency, (Continued)

and thus a useful hydrocarbon fuel is produced from carbon dioxide, thereby providing a carbon dioxide-reducing effect.

10 Claims, 4 Drawing Sheets

(51) Int. Cl.
  *B01D 3/42* (2006.01)
  *B01D 5/00* (2006.01)
  *C10G 2/00* (2006.01)
  *C10K 3/02* (2006.01)
  *C10L 3/10* (2006.01)

(52) U.S. Cl.
  CPC ............... *C10G 2/32* (2013.01); *C10K 3/026* (2013.01); *C10L 3/104* (2013.01); *C10L 2290/42* (2013.01)

(56) References Cited

U.S. PATENT DOCUMENTS

| | | | | |
|---|---|---|---|---|
| 2011/0044860 | A1* | 2/2011 | Severinsky | C10G 2/32 422/187 |
| 2011/0294906 | A1* | 12/2011 | Huffman | C07C 1/0485 422/625 |
| 2014/0316016 | A1 | 10/2014 | Jennings | |
| 2017/0271701 | A1* | 9/2017 | Berlowitz | H01M 8/04805 |
| 2018/0171250 | A1* | 6/2018 | Chapman | C10L 3/08 |

FOREIGN PATENT DOCUMENTS

| | | |
|---|---|---|
| CN | 103059899 A | 4/2013 |
| CN | 104232193 A | 12/2014 |
| DE | 10 2013 102 969 A1 | 9/2014 |
| JP | 2015-51954 A | 3/2015 |
| KR | 10-2007-0122215 A | 12/2007 |
| KR | 10-2014-0085671 A | 7/2014 |
| KR | 10-1626800 B1 | 6/2016 |
| KR | 10-2018-0004165 A | 1/2018 |

OTHER PUBLICATIONS

Written Opinion issued for corresponding International Patent Application No. PCT/KR2020/001275 on Aug. 31, 2020.

Korean Office Action dated Oct. 17, 2020 for corresponding Korean application No. 10-2019-0122009.

Office Action issued on Apr. 26, 2023, for corresponding Chinese patent application No. 202080008212.8, along with an English translation (26 pages).

* cited by examiner

CARBON DIOXIDE CONVERSION PROCESS AND SYSTEM THEREFOR

CROSS-REFERENCE TO RELATED APPLICATION

The present application is a national stage filing under 35 U.S.C § 371 of PCT application number PCT/KR2020/001275 filed on Jan. 28, 2020 which is based upon and claims the benefit of priorities to Korean Patent Application No. 10-2019-0013064, filed on Jan. 31, 2019; and Korean Patent Application No. 10-2019-0122009, filed on Oct. 2, 2019, in the Korean Intellectual Property Office, which are incorporated herein in their entireties by reference.

TECHNICAL FIELD

The present disclosure relates generally to a carbon dioxide conversion process and a system therefor. More particularly, the present disclosure relates to a novel carbon dioxide conversion process and a system therefor, wherein by modifying an existing carbon dioxide conversion process/system, it is possible to increase the energy efficiency and carbon reduction efficiency of the entire process/system, and flexibly respond to market conditions.

BACKGROUND ART

Coal and petroleum, which are fossil energy sources that account for more than 50% of the total energy, have been used as important energy sources for mankind for centuries. Throughout history, humans have been releasing thermodynamically stable carbon dioxide generated through various energy conversion processes of such coal and petroleum, without a separate post-treatment process.

However, as it has been recently known that carbon dioxide is the main greenhouse gas that accounts for 55% of the global warming contribution, various techniques for removing carbon dioxide have been proposed. Of these, technologies for converting carbon dioxide using a catalyst into high value-added chemical raw materials such as methanol and olefins or liquid fuels such as gasoline and diesel are most preferred in terms of easy technical linkage with existing industrial processes, securement of a large-scale market for products, and easy treatment of large amounts of carbon dioxide.

The reaction mechanism for synthesis of hydrocarbons through a conversion reaction of carbon dioxide has not yet been clearly clarified, but it is generally known that the reaction proceeds in two stages of successive reaction. Specifically, the conversion reaction of carbon dioxide consists of a first step in which carbon dioxide supplied as a reactant is converted into carbon monoxide through a reverse water gas shift (RWGS) reaction, and a second step in which the resulting carbon monoxide is converted into hydrocarbons by bonding with hydrogen through a Fischer-Tropsch synthesis (FTS) reaction. In this case, the RWGS reaction of the first step is an endothermic reaction, and may be represented by Formula 1 below.

$$CO_2 + H_2 \rightarrow CO + H_2O. \Delta_R H^O{}_{300} = 38 KJ/mol \tag{1}$$

The endothermic RWGS reaction of the first step may be performed under conditions that provide partial conversion of $CO_2$ and $H_2$, resulting in a total product mixture including carbon monoxide (CO) and H2O. Then, the carbon monoxide produced in the first step is subjected to the FTS reaction in the second step. The FTS reaction is an exothermic reaction, and may be represented by Formula 2 below.

$$CO + 2H_2 \rightarrow CH_2 + H_2O. \Delta_R H^O{}_{300} = -166 KJ/mol \tag{2}$$

"$CH_2$" in the above Formula 2 represents a general hydrocarbon moiety that can be incorporated into a larger molecule, such as ethylene ($C_2H_4$) or propylene ($C_3H_6$).

Therefore, as described above, hydrocarbons may be produced from $CO_2$ through the RWGS reaction and the FTS reaction. While $CO_2$ is consumed and synthesized into hydrocarbons through the above process, unreacted $CO_2$ may be recycled back as an input feed to a reactor to increase carbon efficiency.

That is, $CO_2$ is optionally separated from a product mixture of the carbon dioxide conversion reaction and recycled back to an inlet of a carbon dioxide conversion reactor, thereby increasing the overall selectivity of desired hydrocarbons and overall carbon efficiency, as well as increasing the conversion rate of $CO_2$, resulting in a reduction in $CO_2$ emissions, which is an advantageous process in terms of environmental policy.

As a related-art technique, there is disclosed a technique (Korean Patent Application Publication No. 2018-0004165) for increasing carbon efficiency by involving, in producing light olefins from syngas generated from conversion of $CO_2$ through a Fischer-Tropsch synthesis (FTS) reaction, a process of separating $CO_2$ from a product mixture of a RWGS reaction and/or a product mixture of a FTS reaction and recycling the $CO_2$ through a RWGS reaction.

In addition, Korean Patent No. 10-1626800 discloses an eco-friendly synthetic fuel manufacturing method of increasing the production rate of hydrocarbons and reducing carbon dioxide emissions by using, in producing a synthetic liquid fuel including light olefins ($C_2$ to $C_4$) and liquid hydrocarbons ($C_{5+}$) from syngas including a large amount of carbon dioxide by simultaneously performing a FTS reaction and a RWGS reaction, carbon dioxide in a syngas production step or FTS reaction step.

U.S. Pat. No. 8,506,910 B2 discloses a process and system for producing a fuel having a high octane number from carbon dioxide and water. The raw materials for the production line are carbon dioxide and water, and the final product is gasoline, diesel, or other liquid hydrocarbon mixtures. In the above process, products of poor quality or unreacted reactants are recycled. During recycling, these are decomposed into syngas, etc. through partial oxidation reforming, steam reforming, autothermal reforming, etc., and returned to an inlet of a reactor.

However, in the above related-art techniques, there is no concept of recycling of unreacted reactants or FTS off-gases, or even if the recycling is performed, methane included in off-gas is subjected to reforming again to be converted into syngas and then returned to the reactor, which is disadvantageous in that energy efficiency or carbon reduction efficiency is inferior. Therefore, there is a need in the art for a novel $CO_2$ conversion method that improves overall energy efficiency and $CO_2$ reduction efficiency.

Meanwhile, as a technique for improving energy quality and reducing environmental problems, a process of producing syngas from low-quality fossil fuels and producing, from the syngas, a synthetic natural gas that can be used as fuel has recently been actively commercialized in the United States and China. However, the synthetic natural gas produced from the syngas has a calorific value of 9,300 kcal/Nm³, which is lower than a 9,700 to 10,800 kcal/Nm³ calorific value of general liquefied natural gas (LNG) city gas. Because of this, in order to apply the synthetic natural gas to a LNG pipeline network, it is necessary to perform a step of controlling the calorific value of the synthetic natural gas by adding gas fuel such as liquefied petroleum gas (LPG) to meet the LNG city gas pipeline network legal standard. However, this method requires cost for purchasing a separate hydrocarbon, which requires a storage space for the purchased hydrocarbon and additional equipment for controlling the mixing ratio thereof. Therefore, in terms of producing a synthetic natural gas, there is a need to develop a process capable of synthesizing a synthetic natural gas having an appropriate calorific value without requiring provision of additional equipment.

DISCLOSURE

Technical Problem

Accordingly, the present disclosure has been made keeping in mind the above problems occurring in the related art, and an objective of the present disclosure is to provide a carbon dioxide conversion system and method that can improve energy efficiency by reducing the overall energy cost of a process, and thereby reduce carbon dioxide emissions, and to provide a method of manufacturing synthetic natural gas that can be directly connected to an existing LNG city gas pipeline network and used without undergoing an additional calorific value control process.

Technical Solution

In order to accomplish the above objective, the present disclosure provides a carbon dioxide conversion system, including: a first reaction part configured to perform a reverse water gas shift reaction and a Fischer-Tropsch synthesis reaction by introducing carbon dioxide gas and hydrogen gas to convert carbon dioxide into hydrocarbons; a separation part configured to receive an effluent of the first reaction part to separate C5+ hydrocarbons with a carbon number of equal to or greater than five from a mixture of lower hydrocarbons with a carbon number of one to four and unconverted reactants; a recycle part configured to receive the lower hydrocarbons and unconverted reactants separated in the separation part to resupply a part thereof to the first reaction part and supply a remainder thereof to a second reaction part producing a synthetic natural gas; and the second reaction part configured to produce a synthetic natural gas by adding hydrogen to a feed supplied from the recycle part.

In one embodiment of the present disclosure, a reverse water gas shift reaction part configured to perform a reverse water gas shift reaction by introducing carbon dioxide and hydrogen may be further provided at a front end of the first reaction part.

In one embodiment of the present disclosure, the carbon dioxide conversion system may further include a thermal energy supply device configured to supply thermal energy produced in the second reaction part to the reverse water gas shift reaction part.

In one embodiment of the present disclosure, the reverse water gas shift reaction part may include a reverse water gas shift reactor configured to receive carbon dioxide and hydrogen to perform the reverse water gas shift reaction, and a separation device configured to receive an effluent of the reverse water gas shift reactor to separate water and/or carbon dioxide therefrom, wherein the carbon dioxide separated in the separation device may be returned to the reverse water gas shift reactor.

Furthermore, the present disclosure provides a carbon dioxide conversion method, including: a first reaction step of performing a reverse water gas shift reaction and a Fischer-Tropsch synthesis reaction by introducing carbon dioxide and hydrogen to convert carbon dioxide into hydrocarbons; a first separation step of receiving an effluent of the first reaction step to separate the effluent into a stream of C5+ hydrocarbons with a carbon number of equal to or greater than five and a mixture stream of lower hydrocarbons with a carbon number of one to four and unconverted reactants; a recycling step of receiving the stream of lower hydrocarbons and unconverted reactants to resupply a part of the mixture stream of lower hydrocarbons and unconverted reactants to the first reaction step and supply a remainder thereof to a second reaction step of producing a synthetic natural gas; and the second reaction step of producing a synthetic natural gas by adding hydrogen to the remainder of the mixture stream of lower hydrocarbons and unconverted reactants received from the recycling step.

In one embodiment of the present disclosure, the carbon dioxide conversion method may further include a second separation step of receiving an effluent of the second reaction step to separate water therefrom, and controlling an amount of compounds having a carbon number of equal to or greater than two.

In one embodiment of the present disclosure, the carbon dioxide conversion method may further include, before the first reaction step, a reverse water gas shift step of converting carbon dioxide into carbon monoxide by introducing carbon dioxide and hydrogen.

In one embodiment of the present disclosure, the carbon dioxide conversion method may further include a separation step of separating water and/or carbon dioxide from the effluent in the reverse water gas shift step.

In one embodiment of the present disclosure, reaction heat produced in the second reaction step may be used for a reaction in the reverse water gas shift step.

In one embodiment of the present disclosure, a calorific value of the synthetic natural gas produced in the synthetic natural gas generation step may be controlled by controlling process pressure and temperature in the first separation step, wherein the pressure may be in a range of 10 to 50 barg, and the temperature may be in a range of −50 to 0° C.

In one embodiment of the present disclosure, the hydrogen may be hydrogen that is produced by electrolysis of water using electricity produced from water power, solar power, ocean waves, wind power, ocean currents, tides, or a combination of at least two thereof, or hydrogen that is produced by pyrolysis of water using waste heat from a nuclear reactor.

Advantageous Effects

In a carbon dioxide conversion system according to the present disclosure, by allowing a part of unreacted products and lower hydrocarbons that are difficult to liquefy after a Fischer-Tropsch synthesis reaction to be recycled to the Fischer-Tropsch synthesis reaction, and allowing the remainder thereof to be converted to lower hydrocarbons such as methane directly through a hydrogenation process of by-products without being recycled, it is possible to prevent the lower hydrocarbons such as methane, which act as an inert substance in the Fischer-Tropsch synthesis reaction, from accumulating in the reaction system, while improving energy efficiency and carbon yield of the overall process, and reducing carbon dioxide emissions.

In addition, in a carbon dioxide conversion system according to an embodiment of the present disclosure, by further providing a reverse water gas shift (RWGS) reactor at the front end of a Fischer-Tropsch reactor, and using reaction heat of a synthetic natural gas generation reaction as a part of all of the energy required for a reverse water gas shift reaction, it is possible to reduce the use of energy while increasing the amount of $C_{5+}$ hydrocarbons with a carbon number of equal to or greater than five in the total reaction product.

In addition, unlike a product of an existing synthetic natural gas generation process, the synthetic natural gas produced in the carbon dioxide conversion process of the present disclosure has a calorific value similar to that of city gas, and thus can be directly connected to an existing LNG city gas pipeline network without undergoing an additional calorific value control process.

BEST MODE

Unless otherwise defined, all terms including technical and scientific terms used herein have the same meaning as commonly understood by one of ordinary skill in the art to which this invention belongs. Generally, the nomenclature used herein and the experiment methods, which will be described below, are those well known and commonly employed in the art.

As used herein, when any part "includes" any element, this does not mean that other elements are excluded, and such other elements may be further included unless otherwise specifically mentioned.

As used herein, the term "reaction zone" refers to a space in a catalytic reactor in which a reactant gas including carbon dioxide gas, hydrogen gas, and the like comes into contact with a catalyst on a catalyst layer.

Further, the terms "first", "second", etc. are used only for the purpose for distinguishing a constitutive element from other constitutive element, but constitutive elements should not be limited to a manufacturing order, and the terms described in the detailed description of the invention may not be consistent with those described in the claims.

Figure 4:
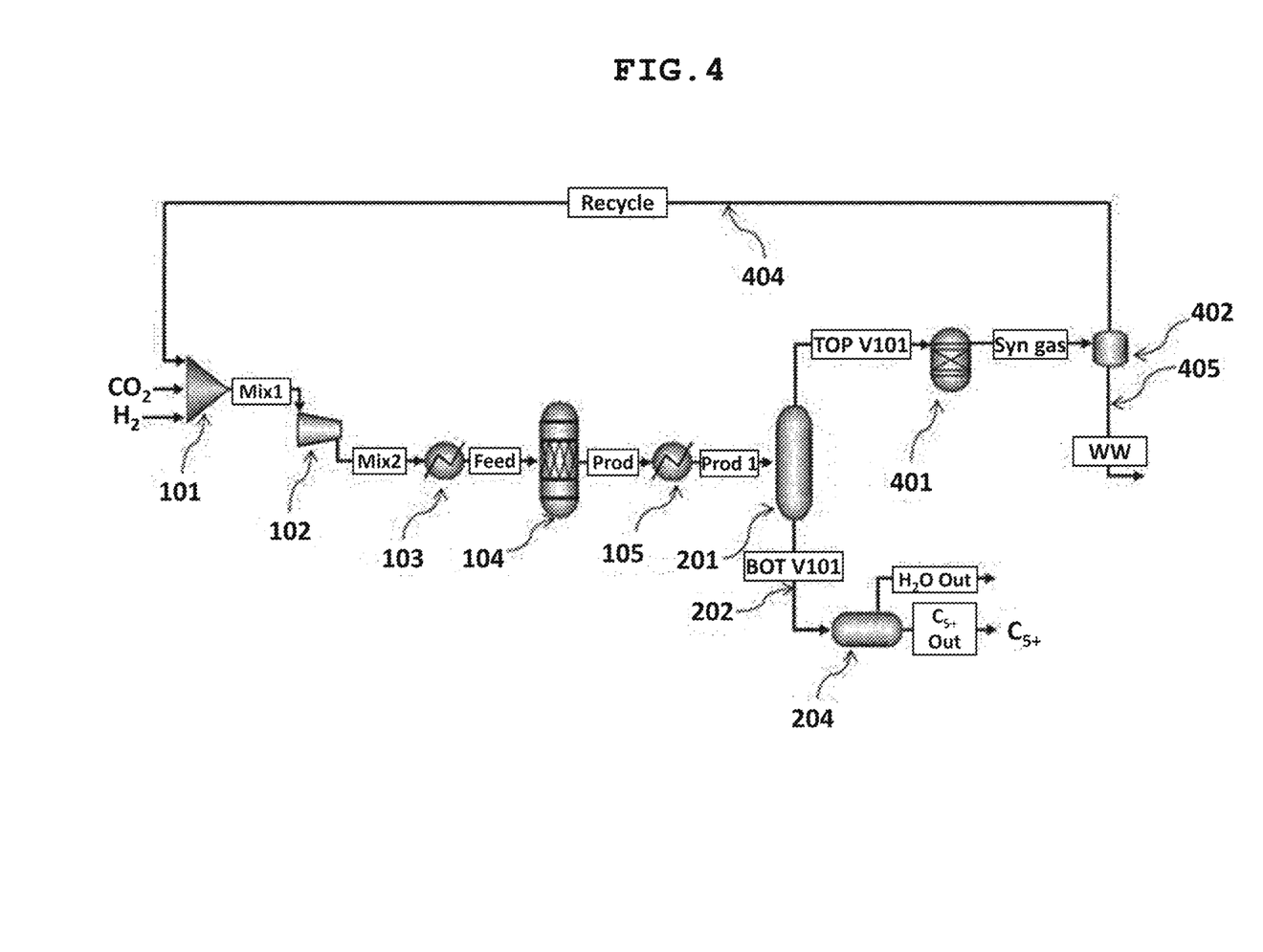
FIG. 4 is a schematic diagram of a carbon dioxide conversion system according to the related art.

A related-art carbon dioxide conversion system is illustrated in FIG. 4.

Referring to FIG. 4, in the related-art carbon dioxide conversion system for obtaining a polymeric hydrocarbon from carbon dioxide, carbon dioxide and hydrogen are mixed together with gas recycled in a first mixer 101, and then compressed under an appropriate pressure for a conversion reaction in a first compressor 102. Thereafter, the resulting compressed mixed gas is subjected to heat exchange in a first heat exchanger 103 and then introduced into a carbon dioxide conversion reactor 104 to perform a carbon dioxide conversion reaction.

A product discharged from the carbon dioxide conversion reactor 104 is subjected to heat exchange again in a second heat exchanger 105 and then introduced into a first separator 201. In the first separator 201, an effluent of the carbon dioxide conversion reactor 104 is separated into a stream of lower hydrocarbons ($C_1$ to $C_4$) with a carbon number of one to four that includes unconverted reactants (carbon monoxide, carbon dioxide, and hydrogen) and a stream of $C_{5+}$ hydrocarbons with a carbon number of equal to or greater than five. The separated $C_{5+}$ hydrocarbons are introduced into a decanter 204 through a line 202, and entrained water is removed therefrom to obtain $C_{5+}$ hydrocarbons as final products.

The lower hydrocarbons and unconverted reactants, which form a stream separated upwardly from the separator, are introduced into a second separator 402 to separate water, etc. therefrom, are recycled to the mixer 101 through a line 404, and then undergo the above-described process again to perform a carbon dioxide conversion reaction. In this case, lower hydrocarbons included in a recycled stream does not participate in the reaction process in the carbon dioxide conversion reactor 104, but act as inert gases, and thus are introduced again into the first separator 201 as they are. The concentration of these lower hydrocarbons is equal to the sum of the recycled lower hydrocarbons and lower hydrocarbons produced in the carbon dioxide conversion reactor 104, and thus the lower hydrocarbons continue to accumulate. In the related art, in order to prevent such accumulation of the lower hydrocarbons, a reforming reaction was performed in which a reforming reactor 401 was placed above the first separator 201 to reform the lower hydrocarbons present in recycled gas back into syngas.

However, due to the fact that the lower hydrocarbons are products produced from carbon dioxide and hydrogen by inputting energy, returning the lower hydrocarbons back to the state before synthesis is a waste of energy. In addition, due to the nature of the reforming reaction, a serious deterioration in energy efficiency occurs due to a strong endothermic reaction.

Focusing on the above point of view, the prevent invention provides a method to prevent accumulation of lower hydrocarbons in a recycled stream without reforming the lower hydrocarbons to be recycled so that energy efficiency and carbon dioxide reduction rate can be increased compared to the related-art process.

That is, in the present disclosure, by branching a part or the entire recycled stream from the recycled stream to perform a methanation reaction to produce a synthetic natural gas (SNG), there is constructed a system that can effectively utilize lower hydrocarbons in the recycled stream is constructed, while preventing the accumulation of lower hydrocarbons in the entire carbon dioxide conversion system.

Figure 1:
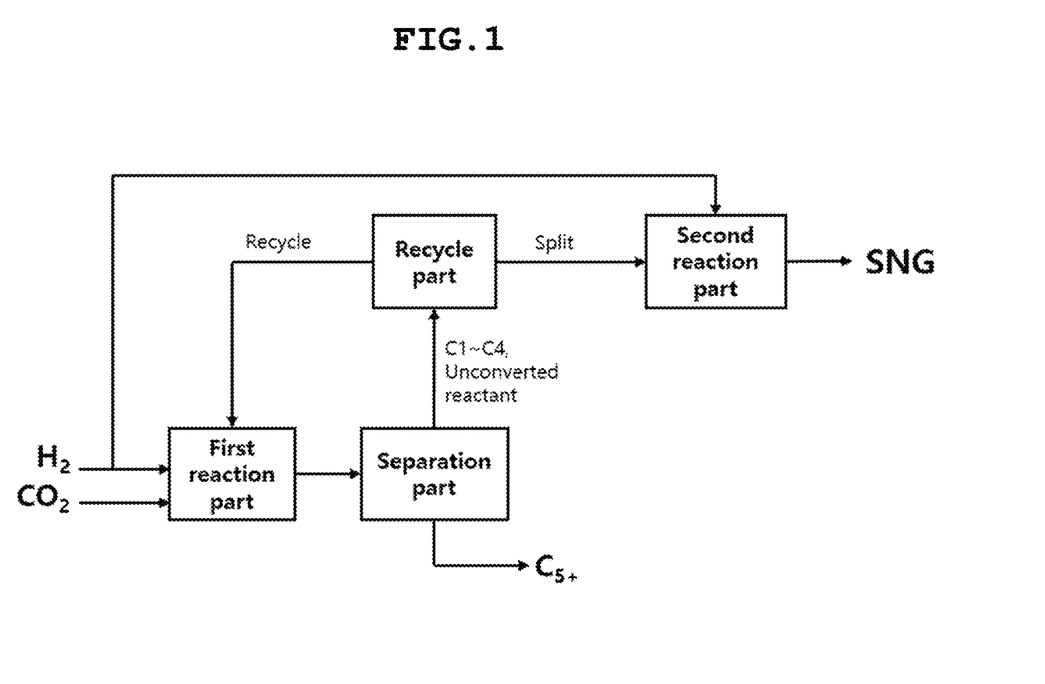
FIG. 1 is a flowchart schematically illustrating the present disclosure.

FIG. 1 is a schematic diagram of the carbon dioxide conversion system according to the present disclosure for converting carbon dioxide into useful compounds using carbon dioxide and hydrogen as raw materials.

A carbon dioxide source in the present disclosure is suitably a carbon oxide emission plant that emits carbon dioxide as a by-product, particularly a plant that needs to reduce its carbon oxide emissions. Examples of the plant include furnaces used to produce steel, and thermal power plants producing electricity using fossil fuels such as coal or gas. Carbon dioxide, carbon monoxide, carbon oxides, or mixtures may be provided by any method, including, but not limited to, those provided from any source.

The hydrogen may be hydrogen produced by electrolyzing water using electricity produced from water power, solar power, ocean waves, wind power, ocean currents, tides, or a combination of at least two thereof. In this case, an electrolyzer may require a significant amount of heat for operation, and the heat may be supplied by water vapor produced elsewhere in the plant together with water for operation. In addition, the hydrogen may be produced by typical electrolysis of water using an electrode, but other methods, including a thermochemical process by pyrolysis of water using waste heat from a nuclear reactor, and a combination of the above methods may be used.

As illustrated in FIG. 1, the present disclosure relates to the carbon dioxide conversion system including: a first reaction part performing a reverse water gas shift (RWGS) reaction and a Fischer-Tropsch synthesis (FTS) reaction by introducing carbon dioxide gas and hydrogen gas to convert carbon dioxide into hydrocarbons; a separation part disposed at a rear end of the first reaction part, and receiving a product mixture of the first reaction part to separate $C_{5+}$ hydrocarbons with a carbon number of equal to or greater than five from lower hydrocarbons ($C_1$ to $C_4$) with a carbon number of equal to or less than four and unconverted reactants ($H_2$, CO, $CO_2$, etc.); a recycle part receiving the lower hydrocarbons ($C_1$ to $C_4$) and unconverted reactants separated in the separation part to resupply the same to the first reaction part; and a second reaction part receiving a part of the lower hydrocarbons ($C_1$ to $C_4$) and unconverted reactants branched from the recycle part to produce a synthetic natural gas through a conversion reaction. In this case, in addition to the hydrogen included in the unconverted reactants, another hydrogen may be further supplied to the second reaction part for producing the synthetic natural gas.

The first reaction part includes a catalytic reactor in which the reverse water gas shift reaction and the Fischer-Tropsch synthesis reaction of carbon dioxide occur simultaneously, thereby producing hydrocarbons.

Specifically, the reactor of the first reaction part may be variably changed in size or shape depending on production capacity, supply amount, and catalyst, and may be controlled by various methods known to those skilled in the art, but preferably, a fixed bed reactor, a fluidized bed reactor, or the like is used. The reaction occurring in the first reaction part includes the reverse water gas shift reaction and the Fischer-Tropsch synthesis reaction, and these reactions may occur sequentially or simultaneously.

At least one reactor in which a catalyst is charged is used in the first reaction part. In the reactor, a catalyst for simultaneously promoting the reverse water gas shift reaction and the Fischer-Tropsch synthesis reaction may be used, or a catalyst for the reverse water gas shift reaction and a catalyst for the Fischer-Tropsch synthesis reaction may be uniformly mixed or arranged in layers. When at least two reactors are used, different types of catalysts may be charged in the respective reactors.

The catalyst for the reverse water gas shift reaction may include, but is not limited to, a metal oxide or a mixed metal oxide as a constituent component and, specifically, at least one selected from the group consisting of copper, zinc, lithium, rhodium, molybdenum, platinum, palladium, etc.

The catalyst for the Fischer-Tropsch synthesis reaction may include, but is not limited to, a metal oxide or a mixed metal oxide as a constituent component and, specifically, at least one selected from the group consisting of iron, copper, manganese, cobalt, nickel, zinc, aluminum, potassium, sodium, etc., or an iron catalyst may be used alone.

In addition, the catalyst may be a solid-supported catalyst. In one embodiment of the present disclosure, examples of a solid support may include various metal salts, metalloid oxides, and/or metal oxides, such as titania (titanium oxide), zirconia (zirconium oxide), silica (silicon oxide), alumina (aluminum oxide), magnesia (magnesium oxide), and magnesium chloride. In a specific embodiment of the present disclosure, examples of the solid support may include alumina ($Al_2O_3$), silica ($SiO_2$), magnesia (MgO), titania ($TiO_2$), zirconia ($ZrO_2$), cerium (IV) oxide ($CeO_2$), or a combination thereof.

In addition, the carbon dioxide gas and hydrogen gas may be supplied to the catalytic reactor at various flow rates. The flow rate and gas hourly space velocity (GHSV) may vary as known in the art.

The reaction in the first reaction part is preferably performed at 200 to 500° C. and 3 to 100 bar. When the reaction occurs at a temperature and pressure below the lower limits of the above-ranges, the conversion reaction of carbon dioxide is insufficient and the production rate of hydrocarbons is low, which is not preferable. On the other hand, when the reaction occurs at a temperature and pressure above the upper limits of the above-ranges, the amount of low molecular weight hydrocarbons is increased and energy efficiency is deteriorated.

In the first reaction part, an exothermic reaction occurs mainly, and selectivity for a product is sensitive to the reaction temperature. Thus, for stable operation, a cooling device for removing heat produced in the reaction part is required. The cooling device may be separately installed at the rear end of the reactor in the form of a heat exchanger, or may be in the form of cooling the reactor itself. In the case where the cooling device is separately installed in the form of a heat exchanger at the rear end of the reactor, it is preferable to use a multistage reaction form in which the reactor and the heat exchanger are arranged successively. In the case where the cooling device is in the form of cooling the reactor itself, it is preferable to use an isothermal reactor or a quasi-isothermal reactor in which the cooling device is installed inside the reactor. As an example of the isothermal or quasi-isothermal reactor, a tube and shell type multi-tubular reactor may be used. A catalyst is installed in a tube, and a reactant is allowed to flow into a catalyst layer to cause a reaction to occur. A cooling medium (mainly water or steam) is allowed to flow into a shell to remove heat produced in a reaction tube. Alternatively, conversely, the cooling medium may be allowed to flow through the tube, and the catalyst layer may be placed in the shell to allow the reactant to flow thereinto to cause the reaction to occur. An another example of the isothermal or quasi-isothermal reactor, a cylindrical reactor having a cooling tube therein may be used so that the cooling medium is allowed to flow through the cooling tube to recover heat of reaction. The cooling tube may be in the form of coils or multi-tubes and may be installed only in a partial area of the reaction tube. For the partial area, it is preferable to select a portion close to an outlet of the reactor (i.e., a lower area in a downward flow type, and an upper area in an upward flow type).

Meanwhile, the separation part is a device that is disposed at the rear end of the first reaction part and separates the product produced in the first reaction part into the stream of $C_1$ to $C_4$ lower hydrocarbons that includes unconverted reactants (carbon monoxide, carbon dioxide, and hydrogen), and the stream of $C_{5+}$ hydrocarbons. The separation may be performed through various techniques known in the art, and non-limiting examples may include a distillation column or a flash drum.

The separation part has an inlet formed at a side thereof, so that the product of the first reaction part is allowed to be introduced into the inlet. From the introduced product, water and/or higher hydrocarbons of equal to or greater than $C_{5+}$ are separated and discharged to outside through a lower portion, etc. of the separation part, and the remaining light products (e.g., $C_1$ to $C_4$ lower hydrocarbons) and unconverted reactants are discharged to an upper portion, etc. of the separation part and supplied to the recycle part.

The recycle part receives the light products (e.g., $C_1$ to $C_4$ lower hydrocarbons) and unconverted reactants from the separation part, resupplies a part thereof to the first reaction part, and supplies a remainder thereof to the second reaction part generating synthetic natural gas. The ratio of a stream resupplied to the first reaction part to a stream introduced into the recycle part is defined as a recycle ratio, and the ratio may be 0 to 0.9 in terms of a volume ratio.

Carbon dioxide in the stream supplied to the first reaction part from the recycle part is reused as a reactant of the first reaction part together with carbon dioxide gas and hydrogen gas injected through the inlet from outside, thereby improving overall carbon efficiency.

A part or the entire stream discharged from the recycle part may be supplied to the second reaction part and converted into synthetic natural gas through a methanation reaction.

The second reaction part includes at least one catalytic reactor, and a synthetic natural gas generation reaction is performed in the catalytic reactor. The second reaction part has an inlet formed at a first side thereof and allowing the stream from the recycle part to be introduced thereinto, and an outlet formed at a second side thereof and allowing a produced product to be discharged therethrough.

A synthetic natural gas generation reactor in the second reaction part may be variably changed in size or shape depending on production capacity, supply amount, catalyst, etc., and preferably, a fixed bed reactor, a fluidized bed reactor, or the like is used.

In the catalytic reactor in the second reaction part, the methanation reaction occurs to produce methane or lower hydrocarbons ($C_1$ to $C_4$) and water through the reaction between by-products introduced into the inlet and additionally introduced hydrogen gas.

As the catalytic reactor in the second reaction part, an isothermal or adiabatic reactor may be mainly used. In the case of the isothermal reactor, the reaction temperature thereof is usually maintained at 250 to 400° C., and in the case of the adiabatic reactor, the reaction temperature thereof may be raised to 700° C. The molar ratio of $H_2/(3CO+4CO_2)$ in the second reaction part is adjusted to 0.9 to 1.1, preferably 0.95 to 1.0, and the reaction is mainly performed in the presence of a Ni-based catalyst. The reactor in the second reaction part may be used in the form of a fluidized bed reactor, a slurry bed reactor, or a fixed bed reactor, and the catalyst may include a solid pellet, granule, plate, tablet, or ring.

In the second reaction part, a very severe exothermic reaction occurs. Thus, for stable operation, a cooling device for removing heat produced in the reaction part is required. The cooling device may be separately installed at the rear end of the reactor in the form of a heat exchanger, or may be in the form of cooling the reactor itself. In the case where the cooling device is separately installed in the form of a heat exchanger at the rear end of the reactor, it is preferable to use a multistage reaction form in which the reactor and the heat exchanger are arranged successively. In the case where the cooling device is in the form of cooling the reactor itself, it is preferable to use an isothermal reactor or a quasi-isothermal reactor in which the cooling device is installed inside the reactor. As an example of the isothermal or quasi-isothermal reactor, a tube and shell type multi-tubular reactor may be used. A catalyst is installed in a tube, and a reactant is allowed to flow into a catalyst layer to cause a reaction to occur. A cooling medium (mainly water or steam) is allowed to flow into a shell to remove heat produced in a reaction tube. Alternatively, conversely, the cooling medium may be allowed to flow through the tube, and the catalyst layer may be placed in the shell to allow the reactant to flow thereinto to cause the reaction to occur. An another example of the isothermal or quasi-isothermal reactor, a cylindrical reactor having a cooling tube therein may be used so that the cooling medium is allowed to flow through the cooling tube to recover heat of reaction. The cooling tube may be in the form of coils or multi-tubes and may be installed only in a partial area of the reaction tube. For the partial area, it is preferable to select a portion close to an outlet of the reactor (i.e., a lower area in a downward flow type, and an upper area in an upward flow type).

Meanwhile, the second reaction part may further include a separation device provided therein. In this case, the separation device is a device that separates and removes water, etc. in the product of the synthetic natural gas generation reaction. The separation may be performed through various techniques known in the art, and non-limiting examples may include a condenser for cooling and separating a reaction product.

The synthetic natural gas produced according to the present disclosure includes lower hydrocarbons ($C_1$ to $C_4$) produced in the first reaction part, and thus may be directly connected to an LNG city gas pipeline network without undergoing a separate calorific value control process, which is much more economical than an existing synthetic natural gas generation process.

Hereinafter, an embodiment of a carbon dioxide conversion system according to the present disclosure will be described in more detail with reference to FIG. 2.

Carbon dioxide and hydrogen are mixed together with gas recycled in a first mixer 101, and then compressed under an appropriate pressure for a conversion reaction in a first compressor 102. In this case, the pressure may be in the range of 3 to 100C bar, preferably 15 to 50 bar.

Thereafter, the resulting compressed mixed gas is subjected to heat exchange in a first heat exchanger 103 and then introduced into a Fischer-Tropsch reactor 104. The temperature of the mixed gas after heat exchange in the first heat exchanger 103 is suitably maintained in the range of 200 to 500° C., preferably 250 to 350° C.

A product discharged from the Fischer-Tropsch reactor 104 is subjected to heat exchange again in a second heat exchanger 105 and then introduced into a first separator 201. In the first separator 201, an effluent of the Fischer-Tropsch reactor 104 is separated into a stream of $C_1$ to $C_4$ lower hydrocarbons that includes unconverted reactants (carbon monoxide, carbon dioxide, and hydrogen) and a stream of $C_{5+}$ hydrocarbons with a carbon number of equal to or greater than five.

The separated $C_{5+}$ hydrocarbons are then introduced into a decanter 204 through a line 202, and entrained water is removed therefrom to obtain $C_{5+}$ hydrocarbons as final products.

The lower hydrocarbons and unconverted reactants are split in a splitter 206 into a stream 207 returned to the first mixer 101 and a stream 205 sent to a second mixer 301 via a line 203. The stream 205 branched from the splitter 206 is mixed with added hydrogen in the second mixer 301, subjected to heat exchange in a third heat exchanger 302, and then introduced into a synthetic natural gas generation reactor 303 to produce a synthetic natural gas.

The conversion rate of the reaction in the synthetic natural gas generation reactor 303 is 100%, so that reactant gases are completely converted and thus unconverted reactants no longer exist. Thereafter, an effluent of the synthetic natural gas generation reactor 303 is introduced into a second separator 305 to remove water therefrom and then discharged as synthetic natural gas.

Meanwhile, the stream 207 branched from the splitter 206 is returned to the first mixer 101, mixed with newly added carbon dioxide and hydrogen, and then passed through the first compressor 102 and the first heat exchanger 103 to perform a reaction in the Fischer-Tropsch reactor 104 to produce hydrocarbons.

Figure 3:
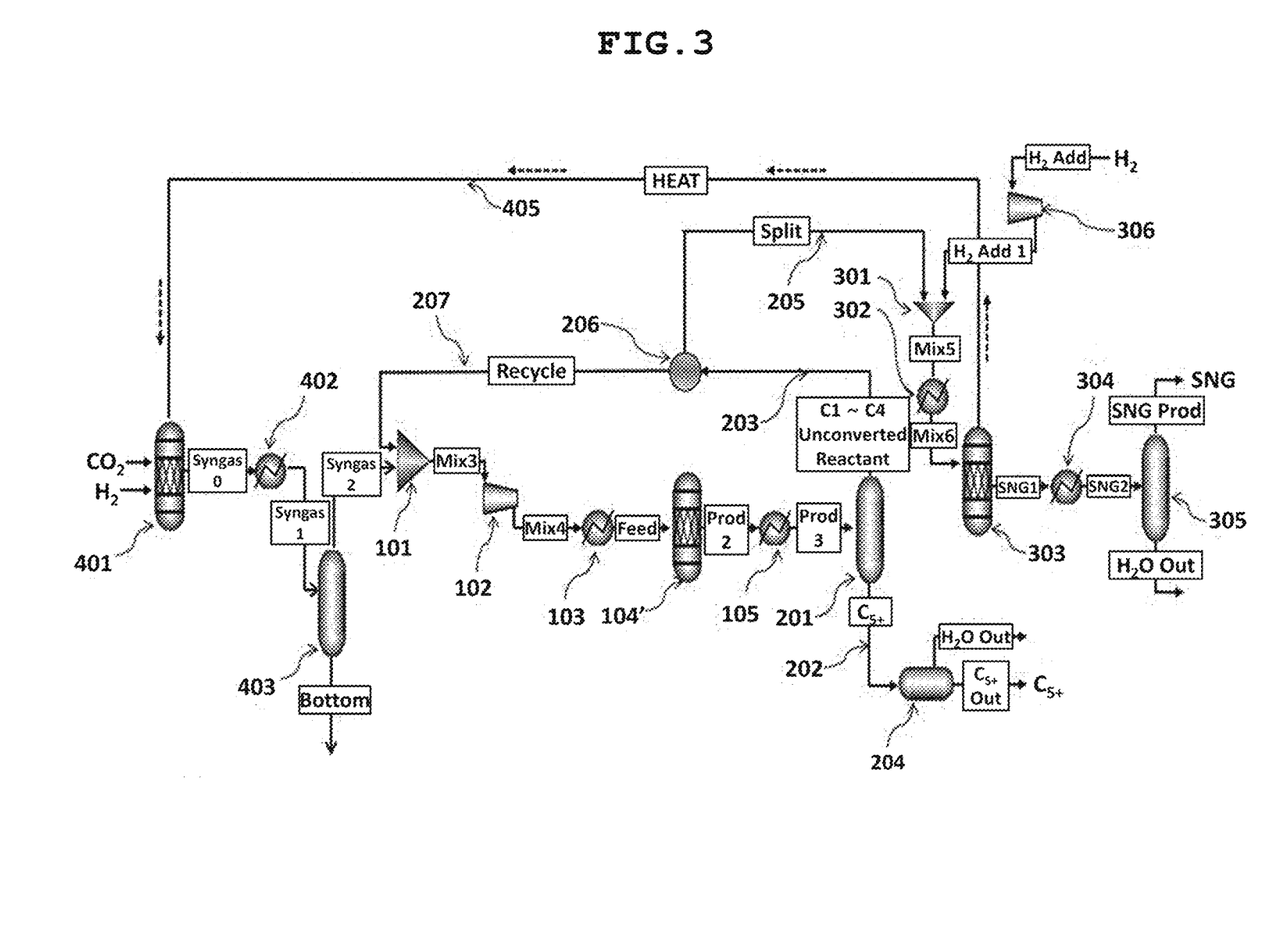
FIG. 3 is a schematic diagram of a carbon dioxide conversion system according to another embodiment of the present disclosure.

FIG. 3 illustrates a carbon dioxide conversion system according to another embodiment of the present disclosure.

The system illustrated in FIG. 3 is another embodiment of the present disclosure, and has a configuration in which a reverse water gas shift reaction part for performing a reverse water gas shift (RWGS) reaction is further installed at a front end of a first reaction part. According to this configuration, the carbon dioxide conversion system includes: the reverse water gas shift reaction part performing the reverse water gas shift reaction by introducing carbon dioxide and hydrogen; a first reaction part receiving an effluent from the reverse water gas shift reaction part to produce hydrocarbons; a separation part receiving an effluent from the first reaction part to separate $C_{5+}$ hydrocarbons with a carbon number of equal to or greater than five from a mixture of lower hydrocarbons with a carbon number of one to four and unconverted reactants; a recycle part receiving the mixture of lower hydrocarbons and unconverted reactants separated in the separation part to resupply a part thereof to the first reaction part and supply the remainder thereof to a synthetic natural gas generation part at a rear end of the recycle part; and a second reaction part producing a synthetic natural gas by adding hydrogen to a feed supplied from the recycle part at the rear end of the recycle part.

In addition, the system may further include a thermal energy supply device for supplying reaction heat of a synthetic natural gas generation reaction to the reverse water gas shift reaction part. At a rear end of the reverse water gas shift reaction part, a carbon dioxide separator may be further provided. The carbon dioxide separator removes water from a product and supplies the product to the first reaction part, or separates carbon dioxide from a product of the reverse water gas shift reaction and returns the carbon dioxide to the reverse water gas shift reaction part and supplies the product from which the carbon dioxide is separated and removed to the first reaction part.

An embodiment of the present disclosure will be described in detail with reference to FIG. 3.

As illustrated in FIG. 3, carbon dioxide and hydrogen are supplied to a reverse water gas shift reactor 401, so that the carbon dioxide is converted into carbon monoxide.

In this case, thermal energy required in the reverse water gas shift reactor 401 may be supplied from a synthetic natural gas generation reactor 303. The supply of the reaction heat produced in the synthetic natural gas generation part to the reverse water gas shift reaction part may be performed in such a manner that heat recovered through a heat exchanger installed in the synthetic natural gas generation reactor 303 is supplied to a flow path formed outside the reverse water gas shift reactor 401 through a thermal energy supply pipe 405 by a heat transfer medium such as steam, oil, and molten salt circulating through a flow path outside. To this end, the reaction heat produced in the synthetic natural gas generation part may be recovered, and the heated heat transfer medium may be allowed to flow to a reactant gas preheater in the form of a heat exchanger installed at a front end of the reverse water gas shift reactor 401, or to a heat exchanger in the form of a heating tube installed inside the reverse water gas shift reactor 401.

Alternatively, reactant gases injected into the reverse water gas shift reactor 401 may be directly used as a heat medium for recovering the reaction heat of the synthetic natural gas generation reactor 303. That is, the reactant gases may be injected into the reverse water gas shift reactor 401 through the heat exchanger installed inside or outside the synthetic natural gas generation reactor 303 after preheating to a high temperature of 400 to 700° C.

The above two methods may be used in combination in order to efficiently receive heat energy required in the reverse water gas shift reactor 401 from the synthetic natural gas generation reactor 303.

In addition, an outer wall of the synthetic natural gas generation reactor 303 and an outer wall of the reverse water gas shift reactor 401 may be installed in physical contact with each other without provision of the heat energy supply pipe 405, so that thermal energy produced in the synthetic natural gas generation reactor 303 may be transferred from the outer wall of the synthetic natural gas generation reactor 303 to the outer wall of the reverse water gas shift reactor 401. Alternatively, the reverse water gas shift reaction and the synthetic natural gas generation reaction may be performed in separate regions separated by a partition wall through a double-tube reactor, so that the reaction heat of the synthetic natural gas generation reaction may be used for the reverse water gas shift reaction.

Therefore, by supplying the reaction heat of the synthetic natural gas generation part to the reverse water gas shift reaction part where an endothermic reaction occurs, it is possible to reduce energy supplied for the reverse water gas shift reaction, and eliminate provision of a heat supply device for the reverse water gas shift reaction and a cooling device for removing reaction heat from the synthetic natural gas generation reactor 303.

In thermodynamic terms, it is advantageous that the reverse water gas shift reaction is performed at a relatively high temperature of equal to or greater than 300° C. The synthetic natural gas generation reaction may be performed at a reaction temperature of equal to or greater than 300° C. or higher, so that it is advantageous to use the reaction heat of the synthetic natural gas generation reaction for the reverse water gas shift reaction.

Thereafter, a stream discharged from the reverse water gas shift reactor 401 is subjected to heat exchange in a heat exchanger 402, introduced into a third separator 403 to remove water therefrom, and then introduced into a first mixer 101. In this case, the third separator 403 may separate carbon dioxide in addition to water from the introduced stream, and then return the separated carbon dioxide back to the reverse water gas shift reactor 401.

Figure 2:
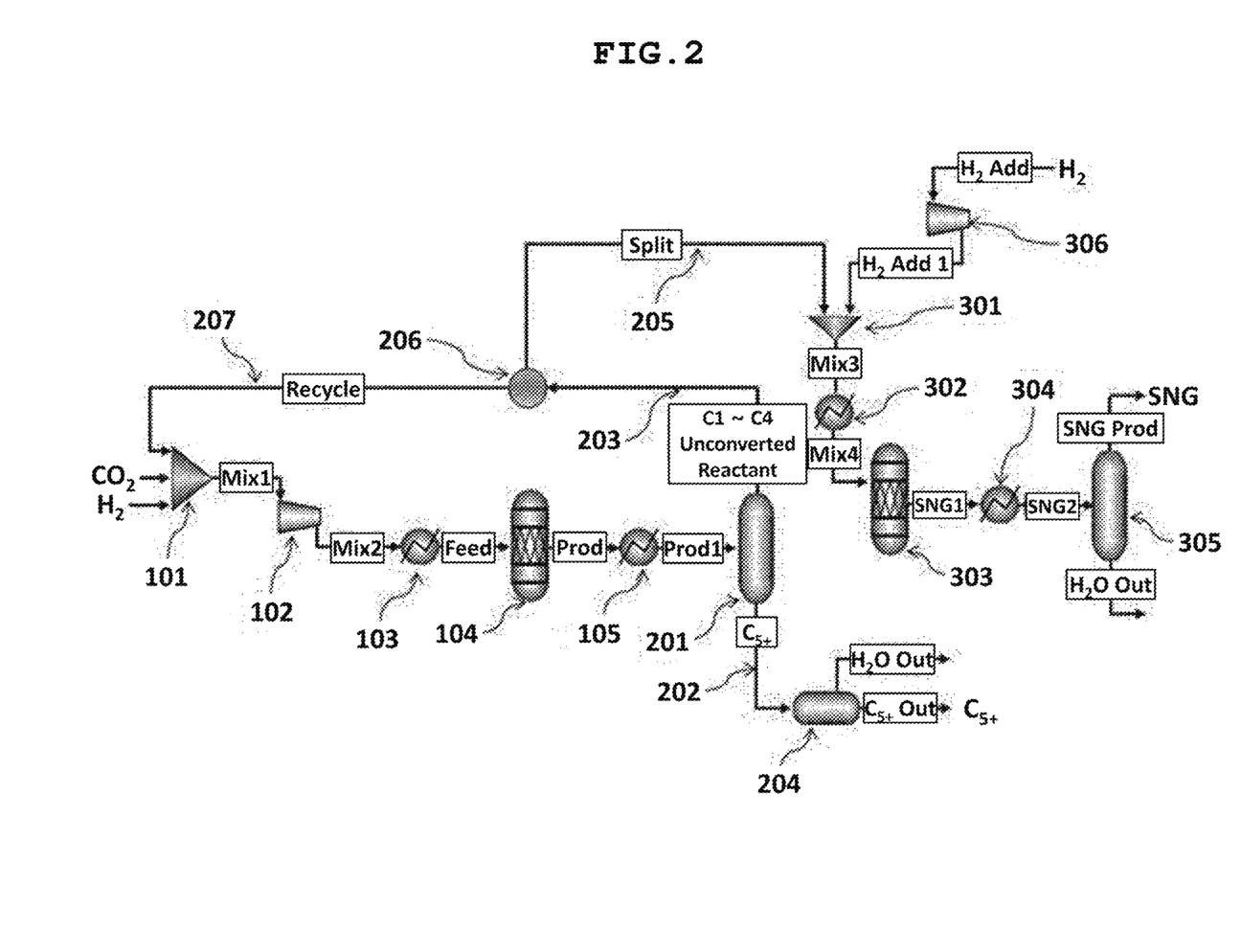
FIG. 2 is a schematic diagram of a carbon dioxide conversion system according to an embodiment of the present disclosure.

A stream discharged from the first mixer 101 is introduced into a Fischer-Tropsch reactor 104' again through the same flow process as described in FIG. 2, so that syngas is converted into hydrocarbons.

One of the differences between the process of FIG. 2 described above and the process of FIG. 3 is that in the process of FIG. 3, carbon dioxide is introduced into the Fischer-Tropsch reactor 104' in a state in which conversion to carbon monoxide has been performed in advance and the carbon monoxide concentration is already high, so that more reactor $C_{5+}$ hydrocarbons may be produced than in the process of FIG. 2.

In addition, due to the fact that the reverse water gas shift reaction has high yield at high temperature, while the Fischer-Tropsch synthesis reaction has high yield at low temperature, it is inevitable to use, as the operating temperature of the Fischer-Tropsch reactor 104 of FIG. 2, an appropriate intermediate temperature between the optimum temperatures of the reverse water gas shift reaction and the Fischer-Tropsch synthesis reaction. However, in the process of FIG. 3, due to the fact that the carbon dioxide is introduced into the Fischer-Tropsch reactor 104' in a state in which the reverse water gas shift reaction has been performed in advance, there is room for maintaining the reaction temperature of the Fischer-Tropsch reactor 104' at a low temperature to be suitable for the Fischer-Tropsch synthesis reaction. Due thereto, in the process of FIG. 3 in which the reverse water gas shift reaction part is provided at the front end of the first reaction part, the production rate of $C_{5+}$ hydrocarbons may be higher compared to the process of FIG. 2 in which no reverse water gas shift reaction part is provided.

In addition, the present disclosure provides a method of converting carbon dioxide into hydrocarbons using the carbon dioxide conversion system described above.

The method of converting carbon dioxide into hydrocarbons according to the present disclosure includes: a first reaction step of performing a reverse water gas shift (RWGS) reaction and a Fischer-Tropsch synthesis (FTS) reaction by introducing carbon dioxide and hydrogen to convert carbon dioxide into hydrocarbons; a first separation step of receiving a product of the first reaction step to separate the product into a stream of light products (e.g., $C_1$ to $C_4$ lower hydrocarbons) and unconverted reactants and a stream of $C_{5+}$ hydrocarbons with a carbon number of equal to or greater than five; a recycling step of receiving the stream of light products (e.g., $C_1$ to $C_4$ lower hydrocarbons) and unconverted reactants in the first separation step to resupply the stream to the first reaction step; and a second reaction step of receiving a remainder stream not supplied to the first reaction step in the recycling step. After the second reaction step, a second separation step of receiving a stream of synthetic natural gas produced in the second reaction step to further separate water and a hydrocarbon having a high boiling point therefrom may be further performed.

In this case, the temperature of the first reaction step may be 200 to 500° C., and the temperature of the second reaction step may be 250 to 700° C.

In addition, it is preferable in terms of maximizing carbon efficiency and energy efficiency and reducing carbon dioxide emissions that the ratio of a stream recycled back to the first reaction step to a stream introduced in the recirculation step is 0 to 0.9 in terms of a volume ratio.

In this case, as the ratio of a stream supplied to the second reaction step increases, the ratio of lower hydrocarbon ($C_1$ to $C_4$) compounds to the total hydrocarbon compounds increases, and as the ratio of by-products resupplied to the first reaction step through a recycling process increases, the amount of higher hydrocarbon ($C_{5+}$) compounds increases.

The calorific value of the synthetic natural gas produced in the second reaction step is related to the amount of the included lower hydrocarbon ($C_1$ to $C_4$) compounds. Thus, according to operating conditions in the first separation step and/or the second separation step, for example, according to control of process temperature and/or pressure, the amount of hydrocarbon compounds ($C_{2+}$) with a carbon number of equal to or greater than two among the lower hydrocarbon ($C_1$ to $C_4$) compounds may be controlled, thereby controlling the calorific value of the synthetic natural gas produced as a final product.

When the pressure in the first separation step is 10 to 50 barg, the temperature is −50 to 0° C., preferably the pressure is 20 to 30 barg, the temperature is −30 to −10° C., the calorific value of the synthetic natural gas produced in the second reaction step may become similar to that of typical city gas.

The controlling of the calorific value of the produced synthetic natural gas may also be performed by controlling pressure and/or temperature in the second separation step. In this case, the pressure of the second separation step may be 10 to 50 barg, the temperature may be −50 to 0° C., preferably the pressure is 20 to 30 barg, the temperature is −30 to −10° C.

In a carbon dioxide conversion process according to the present disclosure, a reverse water gas shift reaction step may be further performed before the first reaction step.

In this case, a part or the entire heat supplied in the reverse water gas shift reaction step may be replaced with reaction heat produced in the second reaction step.

In addition, a carbon dioxide separation step of separating carbon dioxide from a product in the reverse water gas shift step and returning the separated carbon dioxide to the reverse water gas shift step may be further included. A stream resulting from separating and removing the carbon dioxide in the carbon dioxide separation step may be introduced into the first reaction step.

Hereinafter, in describing in detail the principle of exemplary embodiments of the present disclosure, a detailed description of known functions and components incorporated herein will be omitted when it may make the subject matter of the present disclosure unclear.

Examples 1 to 10 and Comparative Example 1

In order to confirm effects of the process according to the present disclosure, process simulation was performed using the Aspen Plus (Aspen Tech.) program. The conditions of each unit reactor during process simulation are illustrated in Table 1 below.

TABLE 1

| Reaction condition | Carbon dioxide conversion reactor | Reforming reactor | Methanation reactor |
|---|---|---|---|
| Temperature (□) | 300 | 850 | 450 |
| Pressure (barg) | 30 | 5 | 10 |

Table 2 below illustrates the results of configuring a process corresponding to that of FIG. 2 as an embodiment of the process according to the present disclosure and performing process simulation using the program. Examples 1 to 10 were configured according to recycle ratio, and for comparison, the process of FIG. 4 was simulated as a related-art technique (Comparative Example 1), and the results are illustrated in Table 2.

The recycle ratio was defined as the ratio of a stream returning to a first reactor to an upper stream of a first separator. Energy Efficiency is a value obtained by dividing the sum of the lower heat values (LHV) of products by the sum of the lower heat value (LHV) of hydrogen and the total energy required for the process operation, and the value of $CO_2$ reduction rate was calculated by subtracting the amount of $CO_2$ consumed by a process from the amount of $CO_2$ produced by the process. In this case, the $CO_2$ produced by the process included the amount of $CO_2$ produced during city gas combustion to produce energy used in the process.

The operating temperature of a first separator 201 before a methanation reaction was 50° C. at 30 bar, and the operating temperature of a second separator 305 after a synthetic natural gas generation reaction was 10° C. at 10 bar.

Table 3 shows a phenomenon in which the calorific value of the produced synthetic natural gas increases as the recycle ratio increases. This is believed to be because the higher the recycle ratio, the greater the tendency for lower hydrocarbons ($C_1$ to $C_4$) to accumulate during the process.

When the recycle ratio is low, the calorific value of the synthetic natural gas is close to the calorific value of standard city gas. On the other hand, when the recycle ratio is high, the calorific value of the synthetic natural gas is so great that it is difficult to directly connect the synthetic natural gas to an LNG city gas pipeline network of standard city gas.

TABLE 2

| Case | Recycle ratio | Fresh $CO_2$, Mt/h | Fresh $H_2$, Mt/h | Energy efficiency | $CO_2$ emissions Mt/h | $C_{5+}$, Mt/h | SNG production Mt/h | Fischer-Tropsch reactor flow rate kmol/h | SNG reactor rate kmol/h |
|---|---|---|---|---|---|---|---|---|---|
| Example 1 | 0 | 4.4 | 0.734 | 0.759 | −4.12 | 0.556 | 0.940 | 400 | 232 |
| Example 2 | 0.1 | 4.4 | 0.730 | 0.756 | −4.11 | 0.583 | 0.907 | 419 | 219 |
| Example 3 | 0.2 | 4.4 | 0.693 | 0.752 | −4.09 | 0.612 | 0.870 | 440 | 205 |
| Example 4 | 0.3 | 4.4 | 0.688 | 0.747 | −4.08 | 0.645 | 0.830 | 462 | 190 |
| Example 5 | 0.4 | 4.4 | 0.681 | 0.742 | −4.06 | 0.681 | 0.784 | 488 | 172 |
| Example 6 | 0.5 | 4.4 | 0.674 | 0.736 | −4.05 | 0.721 | 0.733 | 516 | 153 |
| Example 7 | 0.6 | 4.4 | 0.666 | 0.728 | −4.03 | 0.765 | 0.674 | 548 | 132 |
| Example 8 | 0.7 | 4.4 | 0.658 | 0.718 | −4.01 | 0.815 | 0.605 | 583 | 107 |
| Example 9 | 0.8 | 4.4 | 0.647 | 0.704 | −3.99 | 0.872 | 0.519 | 624 | 80 |
| Example 10 | 0.9 | 4.4 | 0.635 | 0.677 | −3.97 | 0.936 | 0.398 | 668 | 48 |
| Comparative Example 1 | 1.0 | 4.4 | 0.609 | 0.492 | −2.75 | 1.351 | — | 991 | 602 |

According to Table 2, it can be seen that the energy efficiency or $CO_2$ reduction rate of a carbon dioxide conversion process (Examples 1 to 10) according to the present disclosure is higher than that of a related-art process (Comparative Example 1).

Table 3 below illustrates the calorific value of each component of synthetic natural gas (SNG) produced according to changes in the recycle ratio and the total calorific value of the synthetic natural gas calculated based thereon. In addition, the calorific value calculated for each component of typically used city gas is also illustrated in Table 3 for reference.

The calorific value of each component constituting synthetic natural gas such as methane and ethane was calculated by calculating the mole % of each component in the synthetic natural gas produced according to the recycle ratio, and multiplying the calculated mole % by the higher heat value(HHV) of each component.

Accordingly, in order to match the calorific value of the synthetic natural gas produced according to the present disclosure to the calorific value of the standard city gas, computer simulation was performed by changing the temperature of the first separator before recycling.

Modification Example: Changes in Calorific Value of Synthetic Natural Gas According to Changes in Operating Temperature of Separator The calorific value of the synthetic natural gas produced by the present disclosure was calculated using the Aspen Plus (Aspen Tech.) program by configuring a process corresponding to that of FIG. 2, and changing the temperature of the first separator in the process as illustrated in Table 4. The recycle ratio was fixed at 0.9, and other conditions except for the recycle ratio and the temperature of the first separator were calculated under the same conditions as in Example 1 above.

TABLE 3

| Component | Recycle ratio | | | | | | | | | | City gas |
|---|---|---|---|---|---|---|---|---|---|---|---|
| | 0 | 0.1 | 0.2 | 0.3 | 0.4 | 0.5 | 0.6 | 0.7 | 0.8 | 0.9 | |
| $CH_4$ GJ/mol | 0.824 | 0.818 | 0.811 | 0.802 | 0.791 | 0.778 | 0.760 | 0.735 | 0.701 | 0.655 | 0.812 |
| $C_2H_4$ GJ/mol | 0.034 | 0.038 | 0.041 | 0.046 | 0.052 | 0.060 | 0.070 | 0.084 | 0.107 | 0.146 | 0.000 |
| $C_2H_6$ GJ/mol | 0.008 | 0.009 | 0.009 | 0.011 | 0.012 | 0.014 | 0.016 | 0.019 | 0.024 | 0.032 | 0.085 |
| $C_3H_6$ GJ/mol | 0.051 | 0.056 | 0.062 | 0.070 | 0.079 | 0.091 | 0.107 | 0.128 | 0.157 | 0.194 | 0.000 |
| $C_3H_8$ GJ/mol | 0.012 | 0.013 | 0.015 | 0.016 | 0.019 | 0.022 | 0.025 | 0.030 | 0.037 | 0.046 | 0.050 |
| $C_4H_8$ GJ/mol | 0.039 | 0.042 | 0.045 | 0.050 | 0.055 | 0.061 | 0.069 | 0.079 | 0.089 | 0.093 | 0.000 |
| $C_4H_{10}$ GJ/mol | 0.009 | 0.010 | 0.010 | 0.011 | 0.012 | 0.014 | 0.016 | 0.018 | 0.020 | 0.020 | 0.024 |
| Calorific value GJ/mol | 0.976 | 0.984 | 0.994 | 1.006 | 1.020 | 1.039 | 1.063 | 1.093 | 1.136 | 1.187 | 0.971 |
| Calorific value Kcal/Nm³ | 10410 | 10495 | 10601 | 10725 | 10880 | 11076 | 11329 | 11653 | 12111 | 12652 | 10348 |

TABLE 4

| Component | First separator operating temperature | | | | | | City gas |
|---|---|---|---|---|---|---|---|
| | 50° C. | 0° C. | −10° C. | −25° C. | −40° C. | −50° C. | |
| $CH_4$ GJ/mol | 0.655 | 0.717 | 0.800 | 0.809 | 0.820 | 0.825 | 0.812 |
| $C_2H_4$ GJ/mol | 0.146 | 0.142 | 0.090 | 0.086 | 0.080 | 0.076 | 0.000 |
| $C_2H_6$ GJ/mol | 0.032 | 0.029 | 0.017 | 0.016 | 0.014 | 0.014 | 0.085 |
| $C_3H_6$ GJ/mol | 0.194 | 0.126 | 0.049 | 0.038 | 0.029 | 0.024 | 0.000 |
| $C_3H_8$ GJ/mol | 0.046 | 0.028 | 0.011 | 0.009 | 0.007 | 0.005 | 0.050 |
| $C_4H_8$ GJ/mol | 0.093 | 0.035 | 0.012 | 0.006 | 0.003 | 0.003 | 0.000 |
| $C_4H_{10}$ GJ/mol | 0.020 | 0.007 | 0.003 | 0.003 | 0.000 | 0.001 | 0.024 |
| Calorific value GJ/mol | 1.187 | 1.083 | 0.982 | 0.966 | 0.953 | 0.948 | 0.971 |
| Calorific value Kcal/$Nm^3$ | 12652 | 11547 | 10471 | 10296 | 10162 | 10104 | 10348 |

As illustrated in Table 4, it can be seen that the calorific value of the synthetic natural gas decreases as the temperature of the first separator is changed. When the recycle ratio is 0.9, if the separator is operated in the range of −10 to −25° C., the synthetic natural gas has almost the same calorific value as the typical city gas.

From the above results, it can be seen that the process of the present disclosure can control the calorific value of the synthetic natural gas produced by a simple operation such as temperature control of the separator, thereby making it possible to produce a synthetic natural gas of sufficient calorific value to meet laws and regulations, without requiring a separate calorific value control process. Therefore, process convenience is superior compared to an existing synthetic natural gas process, and there is no need to separately purchase and mix LPG, thereby reducing production cost of synthetic natural gas.

Examples 11 to 13

In order to confirm effects of adding a reverse water gas shift reactor for converting carbon dioxide to carbon monoxide by performing a reverse water gas shift reaction in advance, a process corresponding to that of FIG. 3 was configured and process simulation was performed. Examples 11 to 13 were configured according to recycle ratio. During process simulation, the temperature and pressure of a Fischer-Tropsch reactor were set at 300° C. and 30 barg, and the temperature and pressure of a synthetic natural gas generation reactor were set at 450° C. and 10 barg.

The reaction temperature of the reverse water gas shift reactor was changed from 300 to 375° C. as illustrated in Table 5, the molar ratio of hydrogen/carbon dioxide was 3, the pressure was simulated as a thermodynamic equilibrium conversion rate using the REquil model under the condition of 25 barg, an it was assumed that only CO was produced in a reverse water gas shift reaction.

The results of computer simulation are illustrated in Table 5, and for comparison, the simulated values of cases with no reverse water gas shift reactor (Examples 1, 2, and 5) are also illustrated.

TABLE 5

| Case | RWGS reaction | | | $CO_2$ input Mt/h | $H_2$ input Mt/h | $C_{5+}$ production Mt/h | SNG production Mt/h | Fischer-Tropsch reactor flow rate kmol/h | SNG reactor flow rate kmol/h | SNG reactor supply heat Gcal/h | RWGS reactor supply heat Gcal/h |
|---|---|---|---|---|---|---|---|---|---|---|---|
| | Recycle ratio | Temperature ° C. | CO yield % | | | | | | | | |
| Example 1 | 0 | — | — | 4.4 | 0.734 | 0.556 | 0.940 | 400 | 232 | — | — |
| Example 2 | 0.1 | — | — | 4.4 | 0.730 | 0.583 | 0.907 | 419 | 219 | — | — |
| Example 5 | 0.4 | — | — | 4.4 | 0.681 | 0.681 | 0.784 | 488 | 172 | — | — |
| Example 11 | 0 | 375 | 34 | 4.4 | 0.689 | 0.626 | 0.846 | 376 | 170 | −1.45 | 1.43 |
| Example 12 | 0.1 | 350 | 30 | 4.4 | 0.688 | 0.639 | 0.831 | 394 | 166 | −1.41 | 1.32 |
| Example 13 | 0.4 | 300 | 23 | 4.4 | 0.678 | 0.705 | 0.749 | 462 | 141 | −1.17 | 1.09 |

Examples 14 to 16

In calculating the process result value by computer simulation, the actual experimental value was used as an input value in the reverse water gas shift reaction, and a Fischer-Tropsch process and a synthetic natural gas generation process at rear end positions were computer-simulated under the same conditions as in Example 1. The reaction conditions in the reverse water gas shift reaction were the same as in Example 11 except for temperature.

The results of Examples 14 to 16 are illustrated in Table 6, and for comparison, the simulated values of cases with no reverse water gas shift reactor (Examples 1, 2, and 5) are also illustrated.

TABLE 6

| | | RWGS reaction | | | | | | | SNG reactor | SNG reactor | RWGS reactor |
| | | | CO | CH$_4$ | CO$_2$ | H$_2$ | C$_{5+}$ | SNG | Fischer-Tropsch | flow | supply | supply |
| | Recycle | Temperature | yield | yield | input | input | production | production | reactor flow | rate | heat | heat |
| Case | ratio | ° C. | % | % | Mt/h | Mt/h | Mt/h | Mt/h | rate kmol/h | kmol/h | Gcal/h | Gcal/h |
| --- | --- | --- | --- | --- | --- | --- | --- | --- | --- | --- | --- | --- |
| Example 1 | 0 | — | — | — | 4.4 | 0.734 | 0.556 | 0.940 | 400 | 232 | — | — |
| Example 2 | 0.1 | — | — | — | 4.4 | 0.730 | 0.583 | 0.907 | 419 | 219 | — | — |
| Example 5 | 0.4 | — | — | — | 4.4 | 0.681 | 0.681 | 0.784 | 488 | 172 | — | — |
| Example 14 | 0 | 450 | 33.38 | 3.24 | 4.4 | 0.692 | 0.613 | 0.862 | 368 | 168 | −1.41 | 1.58 |
| Example 15 | 0.15 | 400 | 24.40 | 1.21 | 4.4 | 0.691 | 0.634 | 0.840 | 406 | 171 | −1.44 | 1.39 |
| Example 16 | 0.45 | 350 | 14.09 | 0.45 | 4.4 | 0.679 | 0.710 | 0.747 | 489 | 145 | −1.20 | 1.15 |

In a synthetic natural gas (SNG) reactor of Examples 11 to 16 configured according to FIG. 3, which is an embodiment of the present disclosure, heat is expressed as a negative value because it has to be removed, and in a reverse water gas shift (RWGS) reactor, heat is expressed as a positive value because it has to be supplied. According to Table 5, when comparing the amount of heat released during a synthetic natural gas generation reaction and the amount of heat absorbed during the reverse water gas shift reaction in Examples 11 to 13, the amount of heat released is greater than the amount of heat absorbed, and it is thus can be seen that reaction heat of the synthetic natural gas generation reaction can completely replace heat required for the reverse water gas shift reaction.

In Examples 14 to 16 using the actual experimental value of the reverse water gas shift reaction without using the thermodynamic equilibrium value of Table 6, the amount of heat released during the synthetic natural gas reaction is greater than the amount of heat absorbed during the reverse water gas shift reaction, except for Example 14. In Example 14, the amount of heat released during the synthetic natural gas generation reaction and the amount of heat absorbed during the reverse water gas shift reaction are almost equal, indicating that the simulated value by thermodynamic equilibrium is close to the actual experimental value. It can be seen from this that heat required for the reverse water gas shift reaction can be replaced with reaction heat of the synthetic natural gas generation reaction.

Comparing Examples 1, 2, and 5 and Examples 11, 12, and 13, under the same or similar recycle ratio, when the reverse water gas shift reactor is installed at a front end position, the production of syncrude of equal to or greater than C$_{5+}$ tends to increase. It can be seen from this that installing the reverse water gas shift reactor at the front end position is advantageous for the production of syncrude. In addition, when the reverse water gas shift reactor is installed at the front end position, the conversion rate in a Fischer-Tropsch reactor increases and the amount of hydrogen required decreases, so that the flow rate to the Fischer-Tropsch reactor and the subsequent synthetic natural gas generation reactor decreases. It is thus can be seen that the size of each required reactor also decreases, thereby reducing the cost of the reactor.

As confirmed in the above Examples and Comparative Example, the process according to the present disclosure is advantageous over the related-art process in terms of not only having a high carbon dioxide reduction rate or energy efficiency, but also enabling the produced synthetic natural gas to be supplied to and used in an existing LNG city gas pipeline network without requiring a separate calorific value control process.

In addition, when the reverse water gas shift reactor is further installed at a front end of the Fischer-Tropsch reactor, the entire amount of heat produced during the synthetic natural gas generation reaction can be used as the reaction heat of the reverse water gas shift reaction, thereby saving energy, and further increasing the production of syncrude of equal to or greater than C$_{5+}$.

In particular, the present disclosure can be advantageously used in Korea, Japan, etc., where local prices of LNG, etc. are high due to lack of natural resources.

Although embodiments of the present disclosure have been described in detail above, the scope of the present disclosure is not limited to the embodiments and various changes and modifications from the spirit of the present disclosure defined in the following claims by those skilled in the art are also included in the scope of the present disclosure.

The invention claimed is:

1. A carbon dioxide conversion system, comprising:
   a reverse water gas shift (RWGS) reaction part configured to introduce carbon dioxide and hydrogen to perform an RWGS reaction;
   a first reaction part configured to receive an effluent from the RWGS reaction to perform a Fischer-Tropsch synthesis (FTS) reaction to produce hydrocarbons;
   a separation part configured to receive the effluent of the first reaction part to separate C5+ hydrocarbons with a carbon number of equal to or greater than five from a mixture of lower hydrocarbons with a carbon number of one to four and unconverted reactants;
   a recycle part excluding a venting part configured to receive the lower hydrocarbons and unconverted reactants separated in the separation part to resupply a part thereof to the RWGS part and supply a remainder thereof to a second reaction part excluding the venting part to produce a synthetic natural gas to prevent lower hydrocarbons from accumulating in the carbon dioxide conversion system; and
   the second reaction part configured to produce a synthetic natural gas with an appropriate calorific value without a separate calorific value control process part, by adding hydrogen to a feed supplied from the recycle part, wherein the appropriate calorific value is 9,700~10,800 kcal/Nm$^3$.

2. The carbon dioxide conversion system of claim 1, wherein a reverse water gas shift reaction part configured to perform a reverse water gas shift reaction by introducing carbon dioxide and hydrogen is further provided at a front end of the first reaction part.

3. The carbon dioxide conversion system of claim 2, further comprising:

a thermal energy supply device configured to supply thermal energy produced in the second reaction part to the reverse water gas shift reaction part.

4. The carbon dioxide conversion system of claim 2, wherein the reverse water gas shift reaction part comprises a reverse water gas shift reactor configured to receive carbon dioxide and hydrogen to perform the reverse water gas shift reaction, and a separation device configured to receive an effluent of the reverse water gas shift reactor to separate water and/or carbon dioxide therefrom.

5. The carbon dioxide conversion system of claim 4, wherein the carbon dioxide separated in the separation device is returned to the reverse water gas shift reactor.

6. A carbon dioxide conversion method, comprising:
a reverse water gas shift step of converting carbon dioxide into carbon monoxide by introducing carbon dioxide and hydrogen;
a first reaction step of performing a Fischer-Tropsch synthesis reaction by receiving an effluent of the reverse water gas shift step to convert carbon dioxide into hydrocarbons;
a first separation step of receiving the effluent of the first reaction step to separate the effluent into a stream of C5+ hydrocarbons with a carbon number of equal to or greater than five and a mixture stream of lower hydrocarbons with a carbon number of one to four and unconverted reactants;
a recycling step of receiving the mixture stream of lower hydrocarbons and unconverted reactants to resupply a part of the mixture stream of lower hydrocarbons and unconverted reactants to the reverse water gas shift step and supply all the remainder thereof to a second reaction step of producing a synthetic natural gas, thereby preventing the accumulation of lower hydrocarbons within the circulation flow without a venting process; and
the second reaction step of producing a synthetic natural gas with an appropriate calorific value without a separate calorific value control processing, by adding hydrogen to the remainder of the mixture stream of lower hydrocarbons and unconverted reactants received from the recycling step,
a second separation step for receiving the effluent from the second reaction step to separate water and adjust the content of compounds with two or more carbon atoms,
wherein the recycling step adjusts the ratio of the mixture of lower hydrocarbons and unreacted materials that is reintroduced into the first reaction stage, and/or controlling the process pressure and temperature in the first and second separation stages, to achieve the desired calorific value of the produced synthetic natural gas,
wherein the process pressure and temperature in the first and second separation steps are 10 to 50 barg and $-50°$ C. to $0°$ C., respectively, and
the reaction temperature in the RWGS step is controlled within the range of 350 to $400°$ C., and the proportion of the mixture recycled back to the first reaction step is controlled within the range of 0.15 to 0.45, wherein the appropriate calorific value is 9,700~10,800 kcal/Nm$^3$.

7. The carbon dioxide conversion method of claim 6, further comprising:
a separation step of separating water and/or carbon dioxide from the effluent in the reverse water gas shift step.

8. The carbon dioxide conversion method of claim 6, wherein reaction heat produced in the second reaction step is used for a reaction in the reverse water gas shift step.

9. The carbon dioxide conversion method of claim 6, wherein the hydrogen is hydrogen that is produced by electrolysis of water using electricity produced from water power, solar power, ocean waves, wind power, ocean currents, tides, or a combination of at least two thereof, or hydrogen that is produced by pyrolysis of water using waste heat from a nuclear reactor.

10. The carbon dioxide conversion method of claim 6, wherein the hydrogen is hydrogen that is produced by electrolysis of water using electricity produced from water power, solar power, ocean waves, wind power, ocean currents, tides, or a combination of at least two thereof, or hydrogen that is produced by pyrolysis of water using waste heat from a nuclear reactor.

* * * * *